United States Patent [19]
Lankford et al.

[11] 3,849,712
[45] Nov. 19, 1974

[54] ADAPTIVE NUMERICALLY CONTROLLED MACHINE TOOL RESPONSIVE TO DEFLECTION FORCES ON THE TOOL NORMAL TO THE CUTTING PATH

[75] Inventors: Larry G. Lankford, Mahopac; William R. Whittle, Yorktown Heights, both of N.Y.

[73] Assignee: International Business Machines Corporation, Armonk, N.Y.

[22] Filed: June 30, 1972

[21] Appl. No.: 267,802

[52] U.S. Cl............ 318/561, 318/571, 235/151.11
[51] Int. Cl. ........................................... G05b 13/00
[58] Field of Search ........... 318/561, 571, 573, 574; 235/151.11

[56] References Cited
UNITED STATES PATENTS

| | | | |
|---|---|---|---|
| 3,548,172 | 12/1970 | Centner et al. | 318/561 UX |
| 3,573,588 | 4/1971 | Geyer et al. | 318/571 |
| 3,634,664 | 1/1972 | Valek | 318/561 X |
| 3,665,493 | 5/1972 | Glowzewski et al. | 318/561 X |
| 3,671,727 | 6/1972 | Rhoades | 318/561 X |

Primary Examiner—T. E. Lynch
Attorney, Agent, or Firm—Graham S. Jones, II

[57] ABSTRACT

A data processing system supplies numerical control data to a controller for a machine tool connected in a system for adaptively controlling the machine tool feedrate in response to data measured by sensors connected to the machine tool. The deflection forces on a tool operating upon a workpiece are measured and the data processing system program determines the tool deflection force transverse to the path of the tool relative to the workpiece. The program computes the change in deflection required to meet a dimensional tolerance based upon data previously obtained relative to tool deflection characteristics of the tool. Then the program calculates a new control value to change the feed rate to a value intended to provide the desired degree of deflection. The data processing system then supplies the control value to apparatus to modify the feed rate and bite size, accordingly.

3 Claims, 20 Drawing Figures

FIG. 1
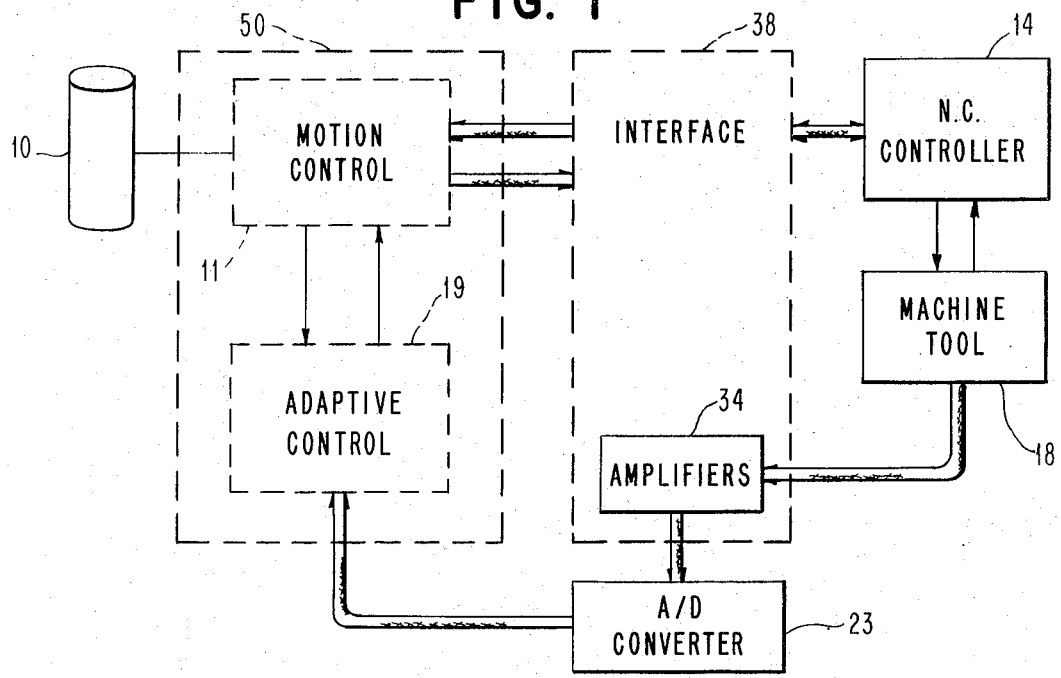
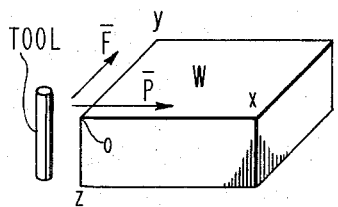
FIG. 2A
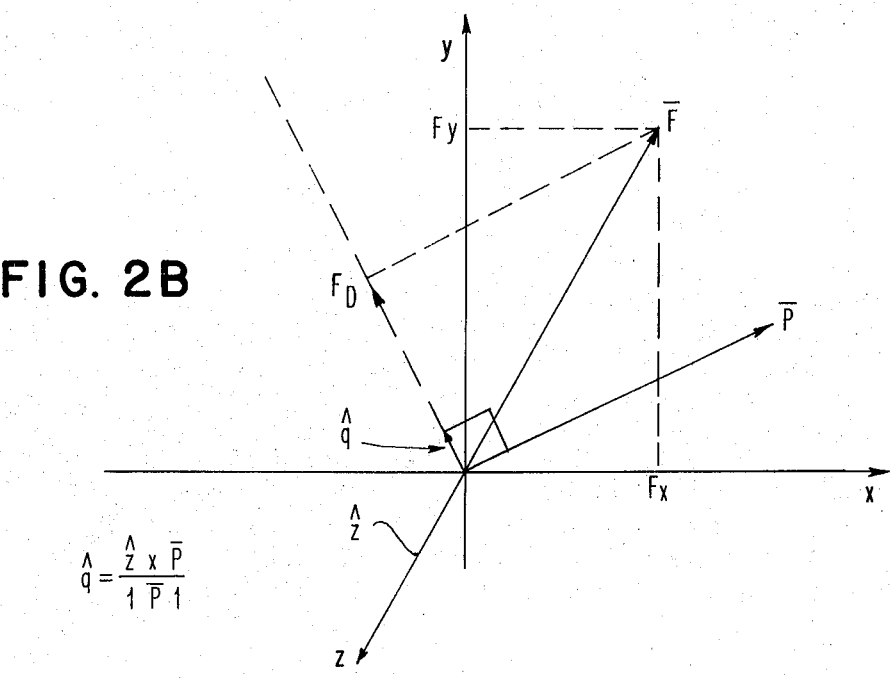
FIG. 2B
$$\hat{q} = \frac{\hat{z} \times \bar{P}}{|\bar{P}|}$$

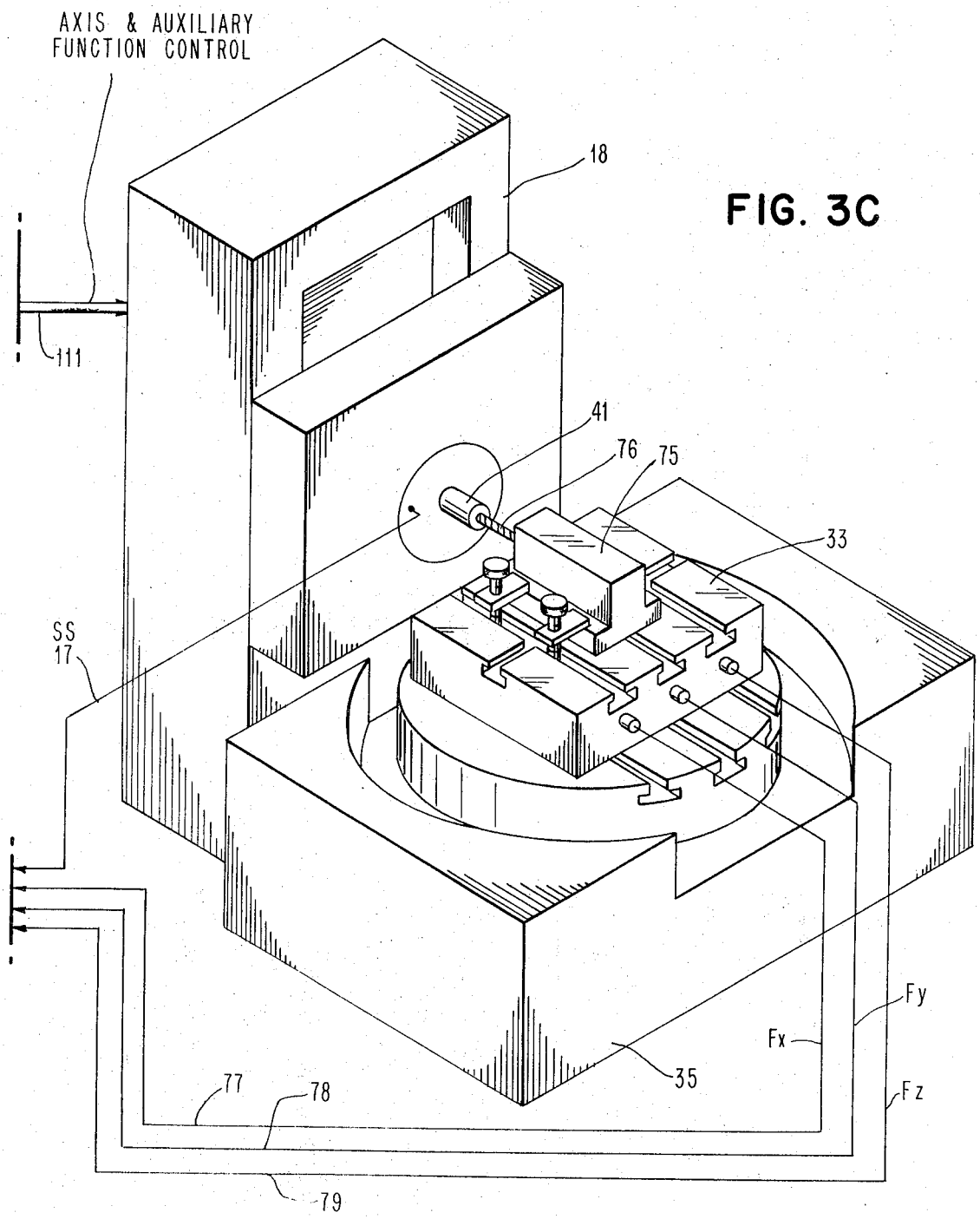

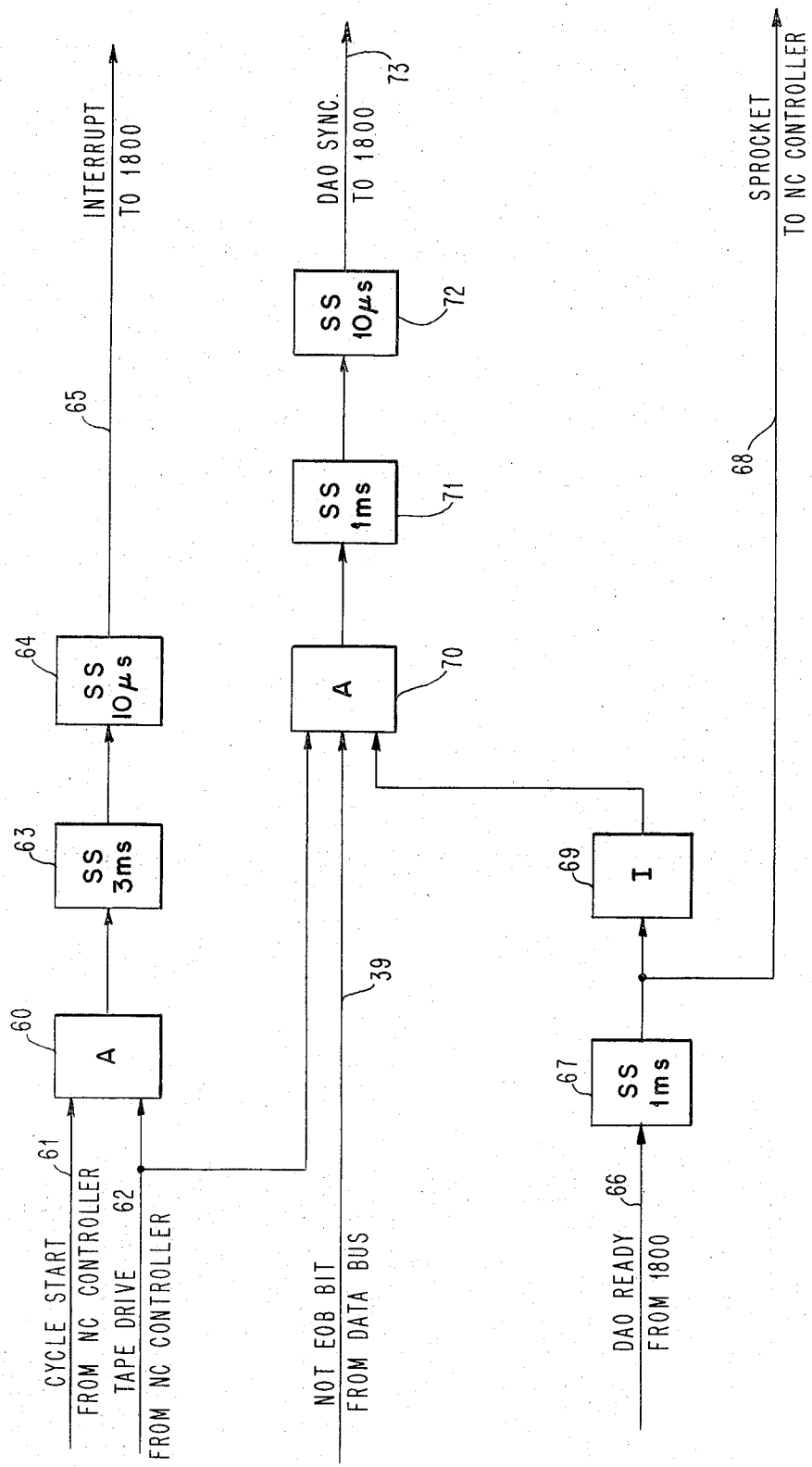

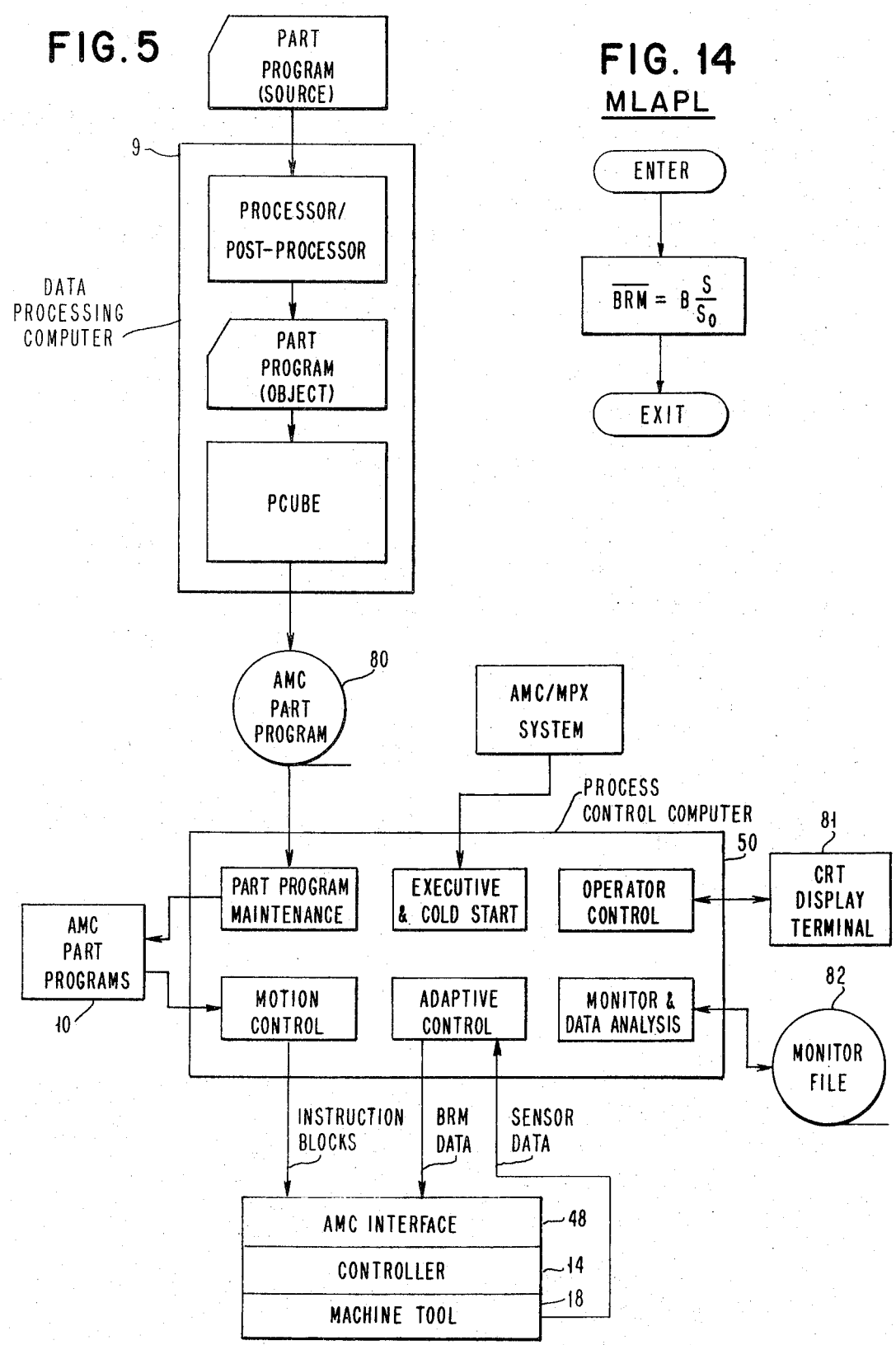

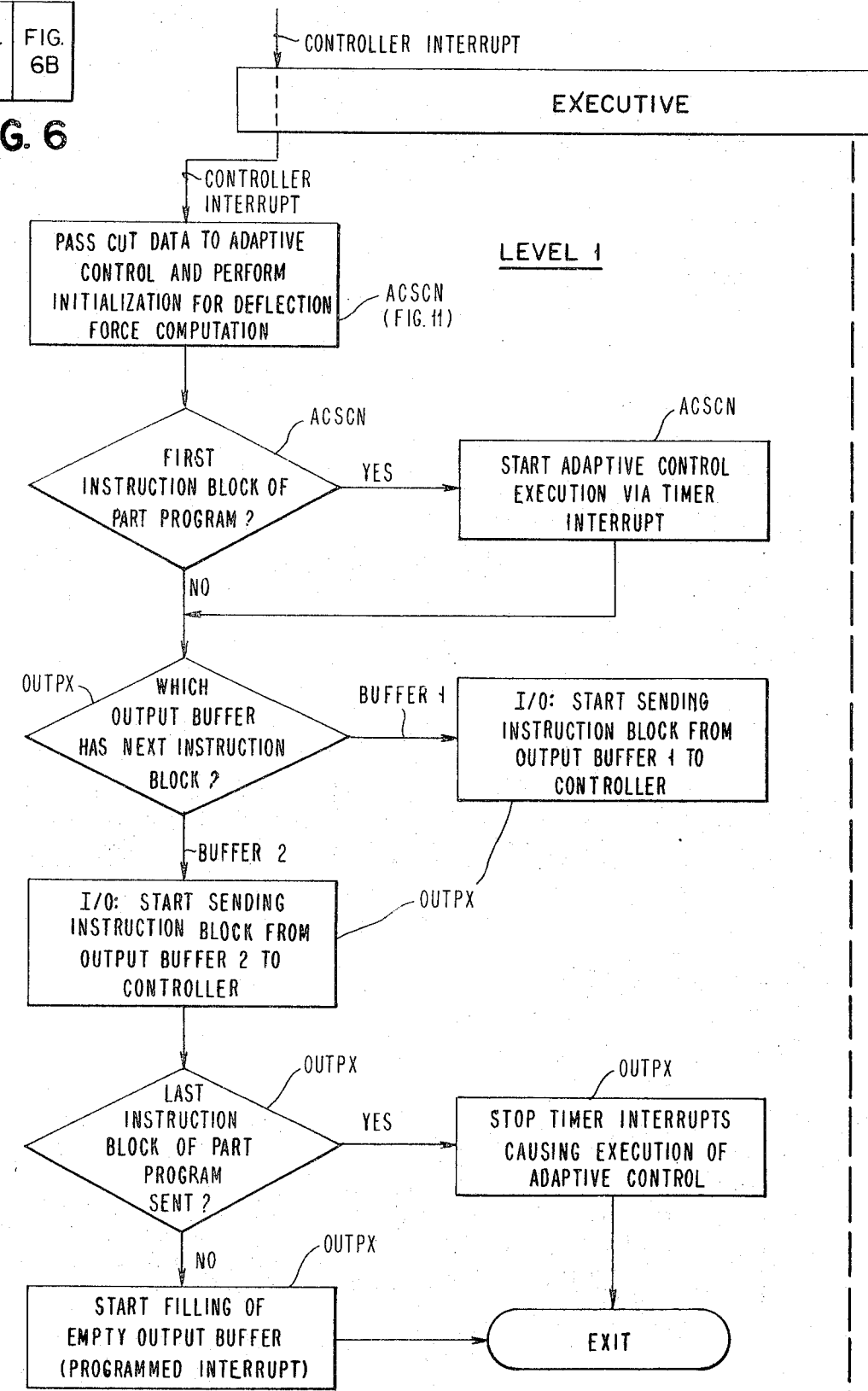

FIG. 7
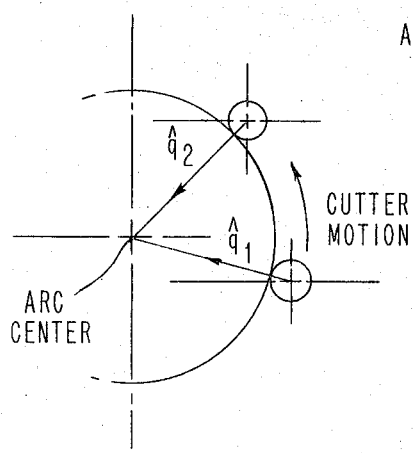
FIG. 8
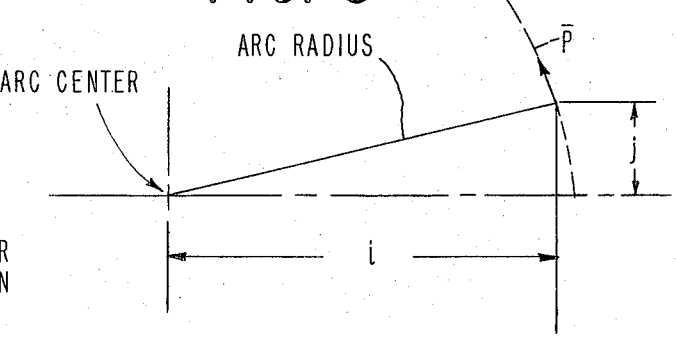
FIG. 9
MLMSR
ENTER
CIRCULAR INTERPOLATION ? — YES → $N\overline{BRM} = N\overline{BRM} + \overline{BRM}$
NO ↓
OBTAIN $F_x$ AND $F_y$
$F_D = C_1 + C_2 F_x + C_3 F_y$
EXIT
IS $N\overline{BRM} \geq LIM$ ? — YES →
$U_2(K+1) = U_2(K) - \theta \dfrac{B_x}{B_y} U_3(K)$
$U_3(K+1) = S\theta \dfrac{B_y}{B_x} U_2(K) + U_3(K)$
$U_1(K+1) = -A_x U_2(K+1) - A_y U_3(K+1)$
$N\overline{BRM} = N\overline{BRM} - LIM$

FIG. 10
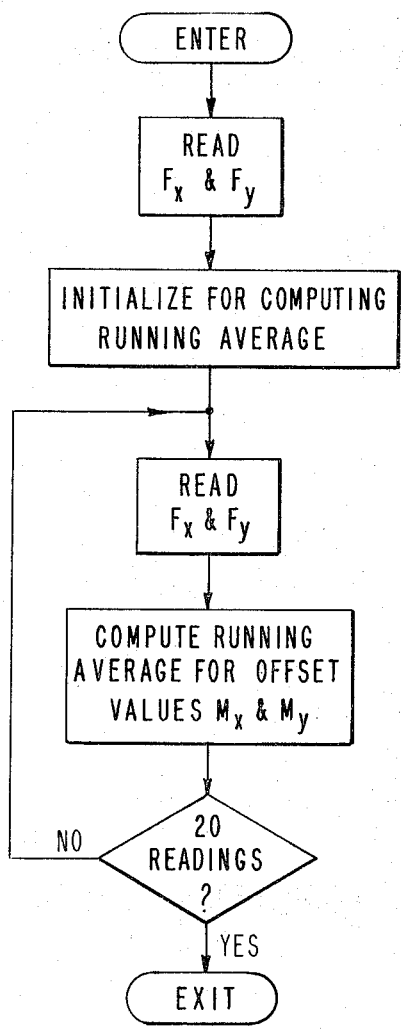
FIG. 11  ACSCN
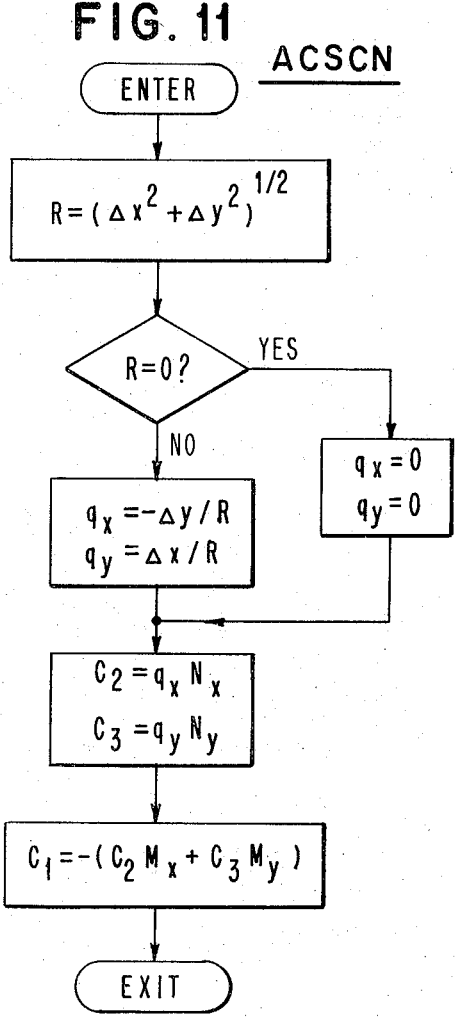
FIG. 13
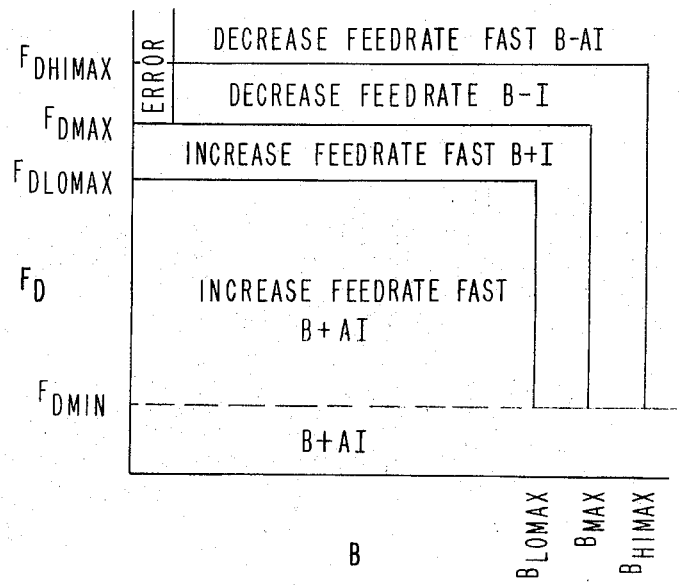

MLOPT

3,849,712

ADAPTIVE NUMERICALLY CONTROLLED MACHINE TOOL RESPONSIVE TO DEFLECTION FORCES ON THE TOOL NORMAL TO THE CUTTING PATH

BACKGROUND OF THE INVENTION

1. Field of the Invention

This invention relates to adaptive numerical control for machine tools which modify numerical control operation based upon variables measured at the machine tool during the machining operation. More particularly, this invention relates to a method of operating a computer system connected to a numerical control system for modifying operation based upon a previously prepared numerical control program to improve performance based upon feedback of deflection forces measured during machining of each part.

2. Description of the Prior Art

Adaptive control of machine tools by systems employing measurements of tool deflection data has been described in the prior art. It is known that the total tool deflection forces provide information as to the degree of feed rate adjustment required, in general. We have found that it tends to require excessive reduction of feed rate speed as compared with the method employed in connection with the current invention. We have discovered that the critical factor in making that adjustment is the component of the force perpendicular to the cutting path.

Accordingly, an object of this invention is to provide for a system providing control of automatic machines or tools and adaptively changing the feedrate, the improvement of controlling the feedrate as a function of the deflection force normal to the cutting path of the tool.

In accordance with this invention, a system and method are provided. The adaptive machine tool or tool control method and system include an automatic tool controller, an adaptive control unit, a program for supplying program control to the controller and corresponding data to the adaptive control unit.

A tool is connected to the controller for operation under the control of the controller.

The tool has a workpiece supported with respect to it. The tool extends towards the workpiece, and a feed motor relatively moves the tool and the workpiece.

A feed rate control unit provides signals to the controller for controlling of the operation of the feed motor in response to feed rate changing signals.

Sensors produce signals proportional to the deflection force between the tool and the workpiece. The adaptive control unit is adapted for calculating the critical component of the deflection force perpendicular to the cutting path directed by the data from the program. The adaptive control unit uses the critical component and provides a feed rate changing output signal varying as a function of the critical component.

The feed speed changing signal is connected to the feedrate control unit from the adaptive control unit.

BRIEF DESCRIPTION OF THE DRAWINGS

FIG. 1 shows a closed-loop, adaptive directly numerically controlled process control computer operated machining system.

FIG. 2A shows a tool and a work piece W with the tool moving along path $\overline{P}$ along the $x$ axis and the deflection force $\overline{F}$ directed along the $y$ axis. The longitudinal axis of the tool is shown parallel to the $z$ axis. The tool is to be used for side or slot milling of W along the surface defined by the $x$ and $z$ axes.

FIG. 2B shows the relationship between forces and a different cutting path $\overline{P}$ from FIG. 2A for a tool cutting a workpiece generally of the kind shown in FIG. 2A.

FIG. 4 is a schematic block diagram of the motion control and data timing block shown in FIG. 3A within interface 38.

FIG. 5 shows the data processing system of FIGS. 1 and 3A, 3B, and 3C from a programming point of view, illustrating the broad data processing functions in very general form, plus a data processing computer in addition to the process control computer for preparing the advanced motion control (AMC) part program.

FIGS. 7 and 8 show the cutter motion about a circular path, indicating parameters employed in circular interpolation in accordance with this invention.

FIG. 9 is a (MLMSR) flow chart for calculating the deflection force normal to the path of the tool, which calculates values for circular interpolation, if required.

FIG. 10 is a flow chart showing computation of the zero offset vector $\overline{M}$.

FIG. 11 shows a flowchart (ACSCN) for initialization of deflection force computation of C1, C2 and C3, called by ACSCN.

FIG. 13 shows the algorithm of FIG. 12 in a chart form with deflection force $F_D$ versus bit size B. The increase and decrease of feedrate and thus bite size B is shown for varying ranges of previous values of B and for varying ranges of $F_D$.

FIG. 14 shows a program for computation of $\overline{BRM}$ which involves multiplication of normalized spindle speed S/So of the motor times the bite size B.

DETAILED DESCRIPTION

Figure 3A:
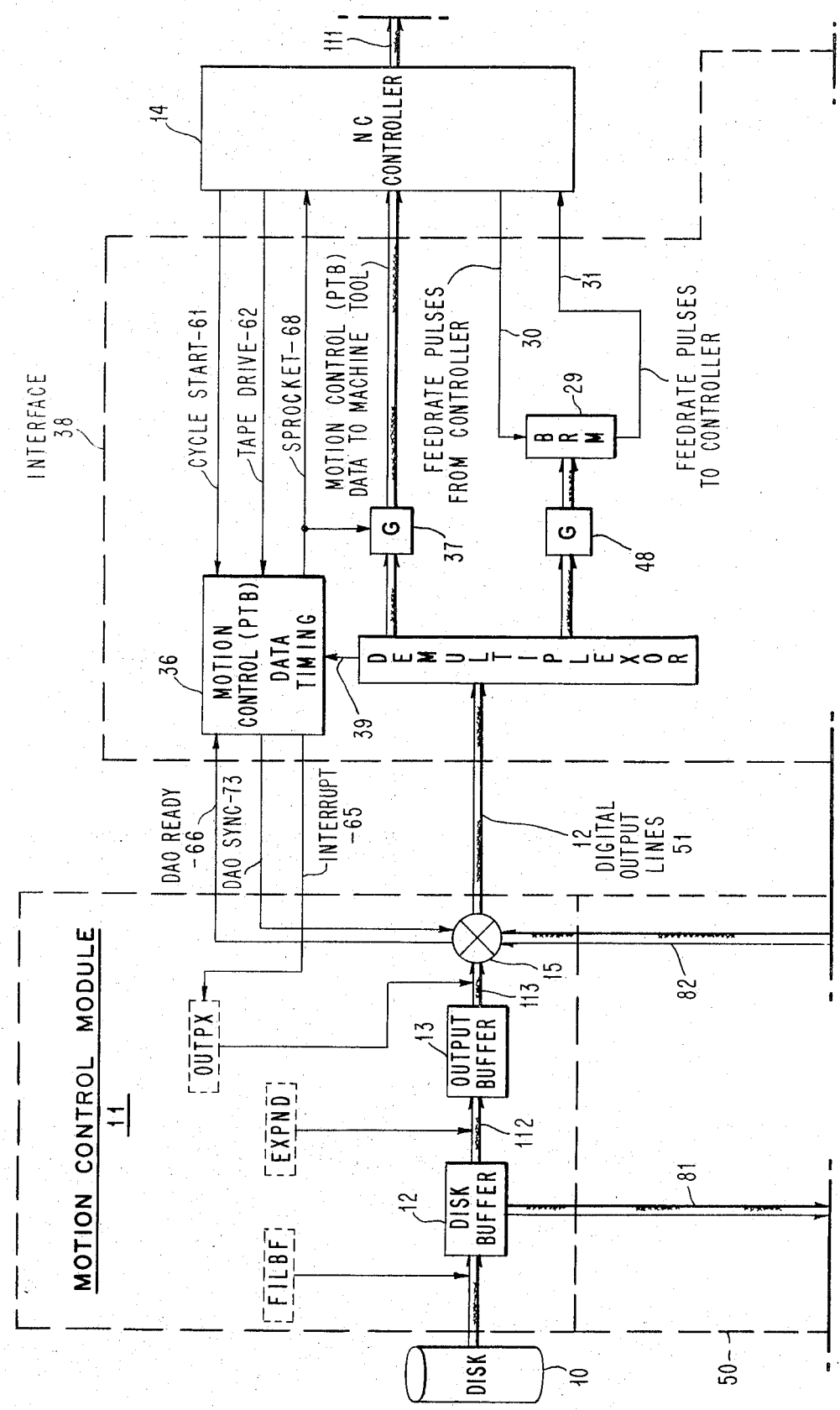
FIG. 3 shows the relationship of FIGS. 3A, 3B and 3C which can be assembled to form a composite partially schematic diagram of the system of FIG. 1 showing both the hardware of FIG. 1 and the control system programmed into the computer.

In typical closed-loop side or slot milling control systems or adaptive control systems the magnitude of the force tending to deflect the cutter from its desired path is measured and controlled. Since the metal directly in front of the cutter will be removed by the next tooth on the cutter as it rotates, only deflections of the cutter perpendicular to the path direction and therefore only forces perpendicular to the path direction affect the surface of the part being milled. The instant invention combines the known path direction with a measured force (direction and magnitude) to obtain an indicated deflection perpendicular to the cutting path. Then, in conjunction with maximization of the cutter's bite size, this indicated deflection is maintained within certain limits (as specified by the tolerance of the particular cut) by reducing the feed rate, thereby slowing cutting and reducing the deflection.

Hardware upon which this invention can operate includes a closed-loop computer-controlled machining system, shown in FIG. 1.

A disc 10 supplies program control data to a process control computer 50 connected reciprocally through an interface 38 to numerical control controller 14 adapted to drive machine tool 18. Sensors on tool 18 are connected through amplifiers 34 in interface 38 and A/D converter 23 to adaptive control program module 19 in computer 50. Computer 50 includes a motion control program module which interacts with the adaptive control module 19. The total system provides adaptive, on-line control of the machining of parts by the numerically controlled machine tool.

With this system measurements of the cutting deflection force, $\overline{F}$ can be introduced into a central processing unit of a computer. Data describing the path direction, $\overline{P}$, is contained in a part program. The path direction vector, $\overline{P}$, is used to compute a unit vector, $\hat{q}$, perpendicular to $\overline{P}$ (see FIG. 2B):

$$\hat{q} = \hat{z} X \overline{P}/|\overline{P}| \tag{1}$$

where $$\overline{P} = \begin{bmatrix} P_x \\ P_y \end{bmatrix},$$

the path direction
$\hat{z}$ = a unit vector in the z direction, perpendicular to both x and y, and
X = denotes the cross product This computation of $\hat{q}$ is performed at the beginning of each path change. Then at each sampling time of the control system a new variable, $F_D$, the component of force perpendicular to the path direction (see FIG. 2B) is calculated:

$$F_D = \hat{q} \cdot \overline{F} \tag{2}$$

where $$\overline{F} = \begin{bmatrix} F_x \\ F_y \end{bmatrix},$$

the components of the measured force, and · represents the dot product.

In actual operation a zero offset vector, $\overline{M}$ (see Flowchart FIG. 10), and a calibration (or gain) matrix, $\overline{N}$, are applied to bring the analog-to-digital converter (ADC) readings to reflect values of the measured force, $\overline{F}$, in pounds. Let $$\overline{F}_{in} = \begin{bmatrix} F_{xin} \\ F_{yin} \end{bmatrix}$$

be the force vector as read (3)
from the ADC points $$\overline{M} = \begin{bmatrix} M_x \\ M_y \end{bmatrix}$$

be the zero-offset vector, (4)
defined during some initialization period, and $$\overline{N} = \begin{bmatrix} N_{xx} N_{xy} \\ N_{yx} N_{yy} \end{bmatrix}$$

be the calibration matrix such (5)
that
$$\overline{F} = \overline{N}[\overline{F}_{in} - \overline{M}], \tag{6}$$

where $N_{xy}$ and $N_{yx}$ represent crosstalk corrections and $N_{xx}$ and $N_{yy}$ represent the relation between ADC readings and actual pounds force; assuming no crosstalk, $N_{xy} = N_{yx} = 0$
$N_{xx} = N_x$
$N_{yy} = N_y$.

Referring to FIG. 2, we have
$\hat{q} = \hat{z} X \overline{P}/|\overline{P}|$ $$\hat{q} = \begin{bmatrix} q_x \\ q_y \end{bmatrix} = \begin{bmatrix} -\Delta y \\ \Delta x \end{bmatrix} \frac{1}{(\Delta x^2 + \Delta y^2)^{1/2}} \tag{7}$$

where the values of $$\overline{P} = \begin{bmatrix} \Delta x \\ \Delta y \end{bmatrix}$$

are contained in the part program.
Since from Eq. (6) $\overline{F} = \overline{N}[\overline{F}_{in} - \overline{M}]$, $$F_D = \hat{q} \cdot \overline{F} = \hat{q} \cdot \{\overline{N}[\overline{F}_{in} - \overline{M}]\} \text{(See Eq. (2))} \tag{8}$$

$$F_D = -\hat{q} \cdot \overline{(NM)} + \hat{q} \cdot \overline{(NF_{in})}. \tag{9}$$

Substituting Eqs. (6), (4) and (5) into Eq. (9) gives
$$F_D = -q_x {}^rN_xM_x - q_yN_yM_y + (q_xN_x)F_{in} + (q_yN_y)F_{in}. \tag{10}$$

Collecting the constants of Eq. (10), we define (see Flowchart FIG. 9):
$$F_D = C_1 + C_2 F_{x_{in}} + C_3 F_{y_{in}} \tag{11}$$

where (see Flowchart FIG. 12)
$$C_1 = -(C_2 M_x + C_3 M_y) \tag{12}$$

$$C_2 = q_x N_x = (-\Delta y N_x) \, 1/(\Delta x^2 + \Delta y^2)1/2 \tag{13}$$

$$C_3 = q_y N_Y = (\Delta x N_y) \, 1/(\Delta x^2 + \Delta y^2)1/2 \tag{14}$$

$F_D$ may now be used in a suitable deflection-limited control system as an approximation of the average deflection of the cutter perpendicular to the path direction.

Figure 12:
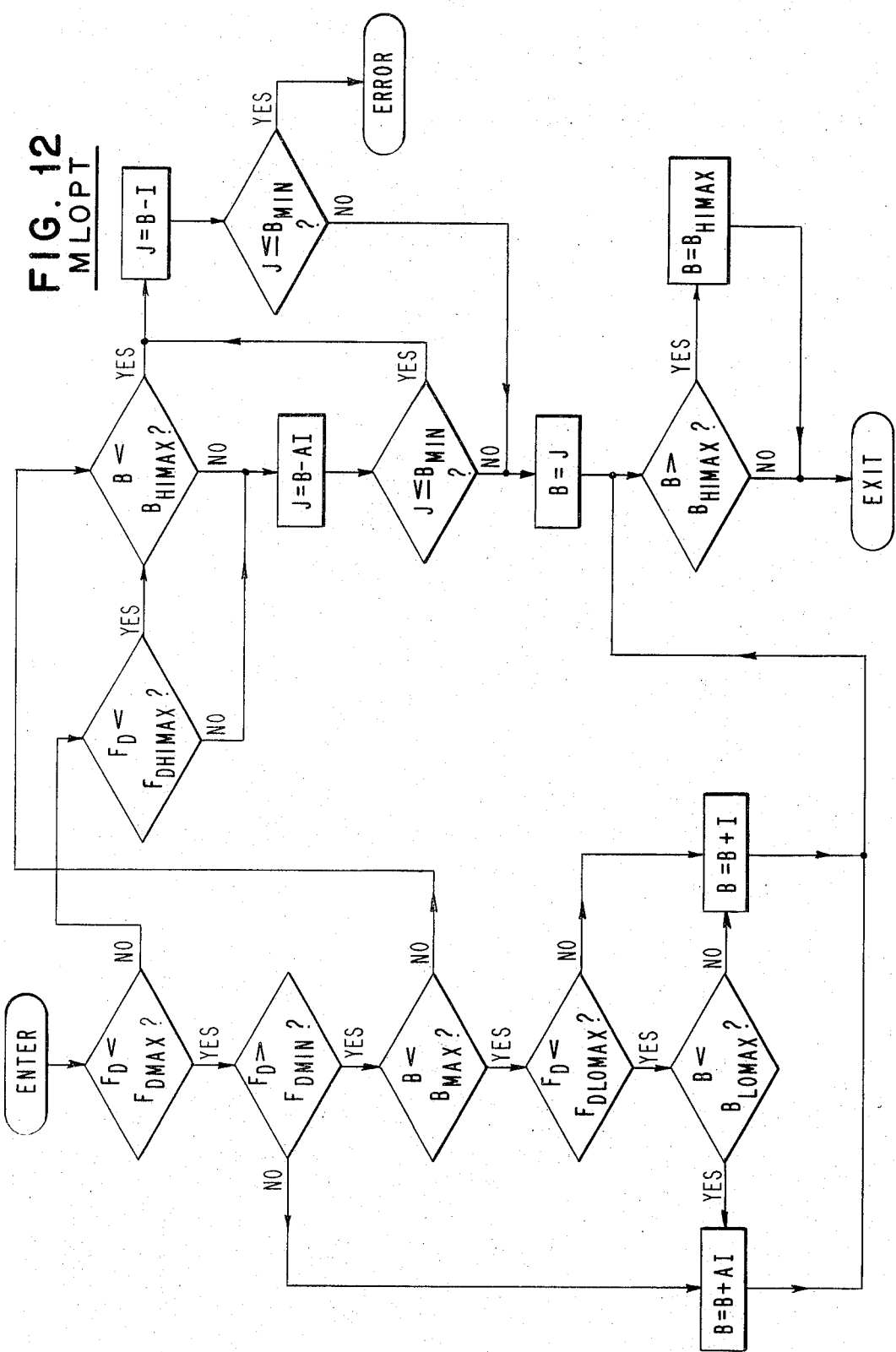
FIG. 12 shows a flowchart (MLOPT) for using deflection force $F_D$ for the maximization of the bit size B which is employed as an index of performance.

Flowchart FIG. 12 shows how the deflection force, $F_D$, is used in the maximization of an index of performance, bite size (B). B is then used to compute the new feed rate to be applied. The purpose of the algorithm shown is to determine in what region $F_D$ lies and to adjust B accordingly. The regions are bounded by the values $F_{DHIMAX}$, $F_{DMAX}$, $F_{DLOMAX}$, and $F_{DMIN}$, where $F_{DHIMAX} > F_{DMIN}$ $F_{DLOMAX} > F_{DMIN}$. These values are unique to each cut. The variables shown on the flowchart are defined as follows:

$F_D$ current deflection force perpendicular to the path direction; calculated as shown in Flowchart FIG. 9

$F_{DHIMAX}$ high maximum deflection force perpendicular to the path direction; prespecified $F_{DMAX}$ maximum deflection force perpendicular to the path direction prespecified $F_{DLOMAX}$ low maximum deflection force perpendicular to the path direction prespecified $F_{DMIN}$ minimum deflection force perpendicular to the path direction; prespecified B current bite size perpendicular to the path direction; calculated as shown in Flowchart in FIG. 12 or feed rate divided by spindle speed times number of teeth on tool $B_{HIMAX}$ high maximum bite size; prespecified
$B_{MAX}$ maximum bite size; prespecified
$B_{LOMAX}$ low maximum bite size; prespecified
$B_{MIN}$ minimum bite size; prespecified
I bite-size increment; prespecified
A high gain multiplier for bite-size increment; prespecified
new, working value of bite size; working variable - see Flowchart FIG. 12

The algorithm is periodically applied in order to produce the desired new feed rates that will maintain $F_D$ within the desired limits.

Above, the unit vector $\hat{q}$, calculated to be perpendicular to the tool path, is used to determine the component of the force of deflection perpendicular to the tool path. The description presumes that the vector $\hat{q}$ is a constant over any particular block of the part program. This is acceptable for point to point and linear contouring operations. However, where the NC controller has circular (or higher order) interpolating hardware, the vector $\hat{q}$ actually rotates as the cutter moves around the circular path (see FIG. 8).

It is possible to combine knowledge of the tool feedrate and knowledge of the circle radius (higher order interpolation parameters) to approximate the required change in the vector.

What follows is a description of the routines necessary to obtain and use a rotating $\hat{q}$ vector in determining the force perpendicular to the path direction during circular interpolation.

Information defining the direction and radius of the circular contour is normally contained in the NC instruction block (see Electronic Industries Association Standard RS-274-B) coded as Ixxxx and Jxxxx. See FIG. 9. Note that the vector $$\begin{bmatrix} i \\ j \end{bmatrix}$$

(where $i$ and $j$ represent in inches the quantities coded as Ixxxx and Jxxxx) is perpendicular to the path direction P.

Therefore to find a unit vector $\hat{q}$ which, in accordance with the technique described above perpendicular to the path direction, initially use the normalized vector $$\begin{bmatrix} i \\ j \end{bmatrix} \frac{1}{\sqrt{(i^2+j^2)}}$$

This vector must, however, be rotated as the cutting continues and the direction of P changes around the circle. For any incremental change in angle $\theta$, $\hat{q}$ can be rotated by:

$$\hat{q}(K+1) = \begin{bmatrix} \cos\theta & -\sin\theta \\ \sin\theta & \cos\theta \end{bmatrix} \hat{q}(k)$$

assuming counterclockwise rotation,

This change in angle $\theta$ (i.e., rotating the x axis into the y axis) over any period of time $\Delta T$ is $\Delta\theta = f\Delta T/r(60)$ where $f$: feedrate (in/min)
$r$: radius (in)

$$r = \sqrt{i^2+j^2}$$

$\Delta T$: is in seconds and 60 is seconds/minute

One approach to the problem would be to rotate the unit vector $\hat{q}$ every control interval. This would require computing $\theta = f/r$ 60 and $q$ ($K+1$) every $\Delta T$.

We have chosen instead to rotate $\hat{q}$ only at selected increments of $\theta$ ($\theta_I$). In order to determine when an increment $\theta_I$ is completed, the variable component of the equation to compute $\Delta\theta$ is assumed each control interval. In the control system under discussion $f = (\overline{BRM})F_o$ $f$ = feedrate (in/min)
$\overline{BRM}$ = The value sent to the Binary Rate Multiplier 29
(FIG. 3A), discussed below. $F_o$ = The feedrate value sent to the controller
$\Delta\theta = f\Delta T/r(60) = [\overline{BRM}/r(60)]F_o \Delta T$ note $\overline{BRM}$ is the only variable part The control intent is to test $$\theta_I \leq \sum_{\Delta T} \frac{(\overline{BRM})}{r(60)} F_o \Delta T$$

$$\theta_I \leq \frac{F_o}{r(60)} \Delta T \sum_{\Delta T} (\overline{BRM})$$

$$\frac{\theta_I r(60)}{(\Delta T)F_o} \leq \sum_{\Delta T} (\overline{BRM})$$

To adjust for the fact that the $\overline{BRM}$ number is actually treated as an integer whereas the equation $\overline{BRM}$ is expressed as a number $0 \leq \overline{BRM} \leq 1$, 1024 (the max integer size of the $\overline{BRM}$) is divided out of the left hand side $$LIM = \frac{\theta_I r(1024)(60)}{\Delta T F_o} \leq \sum_{\Delta T} \overline{BRM}_I = N\overline{BRM}$$

The rotation matrix of equation (1) is more sophisticated than necessary. Advantage is taken of the fact that for small angles
$\cos\theta \approx 1$
$\sin\theta \approx \theta$ for ease of computation $\theta$ can be chosen as $1/2^n$ for some $n$ (allowing division by right shift) for example, $n=3$, $\theta = \frac{1}{8}$ is used in the system. The approximation is not very precise but sufficient for this purpose.

$$\hat{q}(K+1) = \begin{bmatrix} 1 & -1/8 \\ s1/8 & 1 \end{bmatrix} \hat{q}(K)$$

where $s$ is + for counterclockwise machining — otherwise.

In usage
$F_D = \hat{q} \cdot F = U_1 + U_2 F_x + U_3 F_y$
where $U_2(K+1) = U_2(K) - \frac{1}{8}(B_x/B_y) U_3(K)$
$U_3(K+1) = s\frac{1}{8}(B_y/B_x) U_2(K) + U_3(K)$
$U_1(K+1) = -A_x U_2(K+1) - A_y U_3(K+1)$ The program in FIG. 9 is entered once for each control cycle and if the part program calls for circular interpolation, then that portion of the program following YES in the circular interpolation decision box is performed. $C_1$, $C_2$, and $C_3$ are set equal respectively to $U_1$ $(K+1)$, $U_2$ $(K+1)$, and $U_3$ $(K+1)$ and $K$ is then incremented by 1. $\overline{N\,BRM}$ must be zeroed in FIG. 9 at the beginning of any particular block.

Note that the following are assumptions in the above equations.

$s = +1$ for counterclockwise
$\phantom{s} = -1$ for clockwise $$LIM = \frac{(60)\,(1024)\sqrt{i^2+j^2}}{\frac{(1)}{\theta}(\Delta T)(f_o)}$$

Figure 3B:
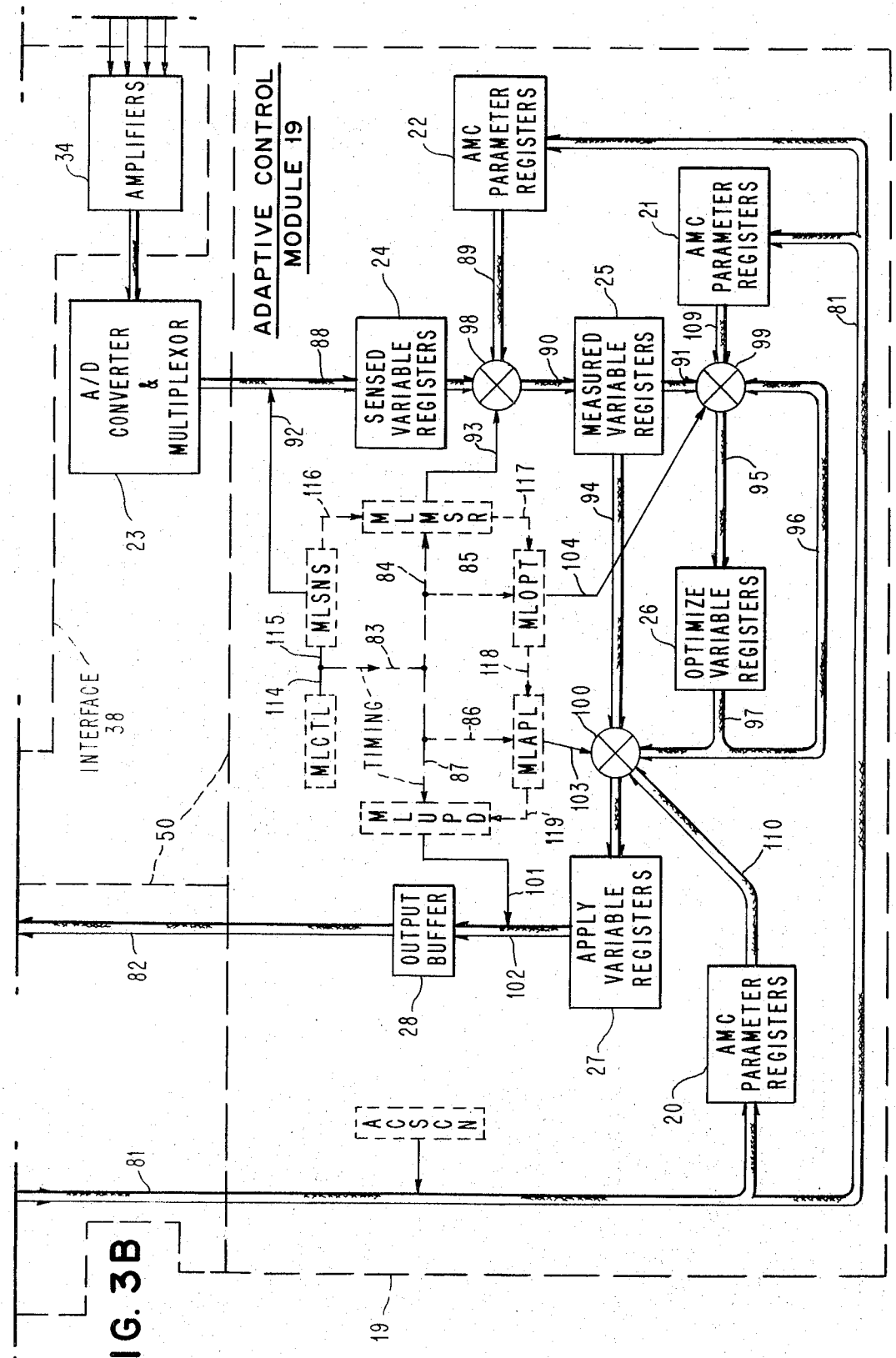

1024 is the maximum value of the $\overline{BRM}$
$\theta$ is the angular increment between adjustments of $\hat{q}$ of $c_1$, $c_2$ and $c_3$ in radians ($\theta = \frac{1}{8}$ is planned)
$T$ is the control period in seconds (e.g. 0.02 sec)
$f_o$ is the programmed feedrate in ipm The closed-loop machine-tool control system, is shown in FIGS. 3A, 3B and 3C. Major elements of the system are a process control computer 50 shown as elements 19 and 11 which includes as peripheral items an analog-to-digital converter 23, and disc storage unit 10. Other major elements of the system are the interface unit 38, numerical control controller 14 and machine tool 18.

Within the process control computer 50 and specifically the motion control module element 11 data is delivered to the digital data output lines 51. That data is made available through cables to the interface 38 through demultiplexor 16. The demultiplexing of the data is controlled by bits 0 and 1 in lines 51. If bit 0 is on, the data is motion control data and is gated out gate 37. But, if data is binary rate multiplier (BRM) data, bit 1 is on and that data is gated out gate 48 to binary rate multiplier, BRM29. Motion controlled data is gated out gate 37 and passed to the numerical control controller 14 through the same lines normally fed by the amplifiers of a paper tape reader which are the same as that contained in most numerical control controllers. The transfer of this motion control data between the computer 50 and the controller 14 is governed by motion control data timing unit 36.

Unit 36 is shown in FIG. 4 in more detailed logic. The logical AND 60 responds to signals on cycle start line 61 and tape drive line 62 both from the controller 14. AND 60 triggers single shot 63 to generate a pulse of about 3 milliseconds duration. Single shot 63 triggers single shot 64 to generate a pulse of 10 microseconds duration which is transmitted to the computer 50 as an interrupt signal on line 65. Cycle start line 61 from controller 14 indicates a state of readiness at machine tool 18 and this function is provided by many conventional controllers. The tape drive line 62 is also found on controllers with paper tape input. Tape drive line 62 carries a signal calling for the tape drive to feed new data. The interrupt generated in computer 50 calls for a new block of data. When computer 50 brings up the first character of a new block of data it raises a line 66 called DAO ready. Line 66 is connected to unit 36 in the interface. In unit 36 a 1 millisecond single shot 67 has its input connected to line 66. Its output is fed back into the controller 14 on a sprocket line 68. The sprocket line 68 is common line in any device feeding a paper tape input interface. The sprocket line pulse indicates to the receiver of the data (controller 14 in this case) that the data in the machine is ready to be taken. The output of the DAO ready single shot 67 for the sprocket line 68 is also inverted by inverter 69 and supplied to AND gate 70 connected into another 1 millisecond single shot 71 followed by a 10 microsecond single shot 72 which has its output connected to DAO Sync. line 73. A DAO Sync. line signal is sent to computer 50 and logically instructs computer 50 that the piece of data which triggered the DAO ready signal has been accepted. The ultimate result of a signal on DAO Sync. line 73 on the channel of computer 50 will be to make ready the next character of the block on the digital output lines 51. The function of AND 70 is to protect against sync. pulses being sent when the tape drive line 62 is down and to assure that no sync is sent out on the last character. That last character is indicated by the presence of an EOB bit signaled by line 39. The presence of the EOB bit is indicated to unit 36 on the interface line 39 in FIG. 3A connected to output lines 51 by demultiplexor 16.

Using the motion control data on lines 51 the controller 14 logically commands the machine 18 to perform auxiliary functions such as to turn on spindle 41 etc. and to move the axes to complete the machining functions. A dynamometer 33 is installed on machine tool table 35. Dynamometer 33 measures cartesian forces $F_z$, $F_y$, and $F_x$ imposed by tool 41 upon work 75 indicated by dynamometer 33. During normal machining a work piece 75 to be machined with the tool 76 in spindle 41 is located on top of dynamometer 33. The dynamometer lines 77, 78, and 79 are connected to amplifiers 34, as is spindle speed line 17 connected to a tachometer secured to spindle 41. The amplifiers 34 in the interface 38 feed an analog-to-digital converter and multiplexor 23 of the variety found in standard data acquisition, process control computers.

The manipulation of data within the motion control module and adaptive control module 19 is described below. Feed rate control data is multiplexed into the digital output registers 15 within motion control module 11. This data is transferred via lines 51 to demultiplexor 16 within interface 38. Data from the gate 48 is fed to the BRM binary rate multiplier 29. This variety of device is described in Handbook of Automation Computation and Control by E.N. Grabbe; 1959; published by Wiley & Sons. Within most controllers 14 having pulse driven interpolators is found a line carrying pulses whose frequency is proportional to the commanded feed rate. In this system that line normally going to the axis interpolators has been cut. The generating side has been taken to deliver the pulses on line 30 to the BRM 29 in interface 38. The BRM 29 returns a fraction of those pulses on output line 31 to controller 14 where it is spliced into the above-mentioned severed line to the axis interpolators. Thus, BRM 29 controls the rate at which pulses feed the axis interpolators in controller 14 and therefore the motion and velocity of the axes of tool 18.

Disk 10 contains part programs supplied to motion control module 11 which includes a FILBF subprogram which fills disk buffer 12 with part program and adaptive control data. The EXPND subprogram takes "paper tape" numerical control data from buffer 12 to fill output buffer 13. OUTPX subprogram transmits data from buffer 13 to N.C. controller 14 on demand via line 113, junction 15, and lines 51, digital output interface 38 and its demultiplexor 16, and gates 37 and 48 to control machine tool 18. Buffer 12 supplies adaptive control data on line 81 to adaptive control module 19 of computer 50 under control of ACSCN adaptive control scan subprogram, distributing the information to adaptive AMC parameter registers 20, 21, and 22 in synchronization with data flowing to controller 14. Subprogram MLCTL, main loop control, is hardware timer driven, timing MLSNS, (main loop sense), MLMSR (Main loop measure) MLOPT (Main loop optimize), MLAPL, (Main loop apply) and MLUPD (Main loop update) subprograms. The MLSNS program at 92 transfers raw data readings of spindle speed on line 17 and $F_x$, $F_y$ and $F_z$ on lines 77, 78, 79 sensed at tool 18 from amplifiers 34 and A-D converter 23 via line 88 to sensed variable registers 24. The MLMSR program at 93 operates junction 98 to combine data in registers 24 with themselves and data in registers 22 to apply zero offsets, scaling factors, and compute deflection force, torque, spindle speed, etc. which is passed on line 90 to be stored in measured variable registers 25. The MLOPT program at 104 combines data in junction 99 from registers 25, register 26 and registers 21 via lines 91, 109 and 96, so as to change registers 26 in a manner tending to increase the value of the index of performance B. The MLAPL program at 103, combines data at junction 100 via 94, 97 and 110 from registers 25, 26 and 20 to compute an output control variable by taking actual spindle RPM in register 25 divided by nominal rpm in register 20, times bite size B in register 26 to produce feedrate $\overline{BRM}$ (FIG. 14) and stores its output in apply variable registers 27. The MLUPD program at 101 multiplexes data through output buffer 28 via 102 and 82 to interface 15 to be transmitted to binary rate multiplier BRM 9 via demultiplexor 16 and gate 48. BRM 29 accepts $\overline{BRM}$ feedrate pulses on line 30, operating on them to emit a reduced number of pulses on line 31 where the ratio between pulses on lines 31 and 30 is proportional to the value delivered to BRM 29 from lines 32. Line 30 supplies pulses from the feed rate interpolator in controller 14. Line 31 drives the axis interpolators in controller 14 at a reduced feed rate.

FIGS. 3A and 3B show the adaptive control and motion control components. Module 11 for the former is shown in FIG. 3A and module 19 for the latter is shown in FIG. 3B. Motion control is driven by interrupts on line 65 from the controller 14. Each interrupt is a request for the next instruction block of the part program. This interrupt is serviced by the module OUTPX. OUTPX controls the filling of two types of buffers: output buffers 13 and disk buffers 12. An output buffer 13 contains a single instruction block to be sent to the controller 14. There are two such buffers 13. While one is being used to transmit an instruction block to the controller the other is being filled via 112 by the module EXPND. This module obtains these instructions blocks from a disk buffer 12 of which there are also two. While one buffer 12 is being used to retrieve instruction blocks to be sent to the controller, the other is being filled with the next disk block of instruction blocks for the part program. A disk block contains several instruction blocks and a collection of these comprise the part program as stored on disk 10. This is done under control of the FILBF module invoked by OUTPX.

The module ACSCN in FIG. 3B provides the control linkage between motion control and adaptive control. Before each instruction block is sent to the controller OUTPX executes ACSCN which passes data carried along with the instruction block to adaptive control via a main storage area accessable to both components This area contains storage locations referred to as software registers. Included are the $\Delta x$ and $\Delta y$ components of the tool path and the maximum force required to perform the cut within the desired tolerance. As well, switches are set signaling adaptive control 19 that a new cut is beginning and that new constants must be computed for the cut.

Figure 6B:
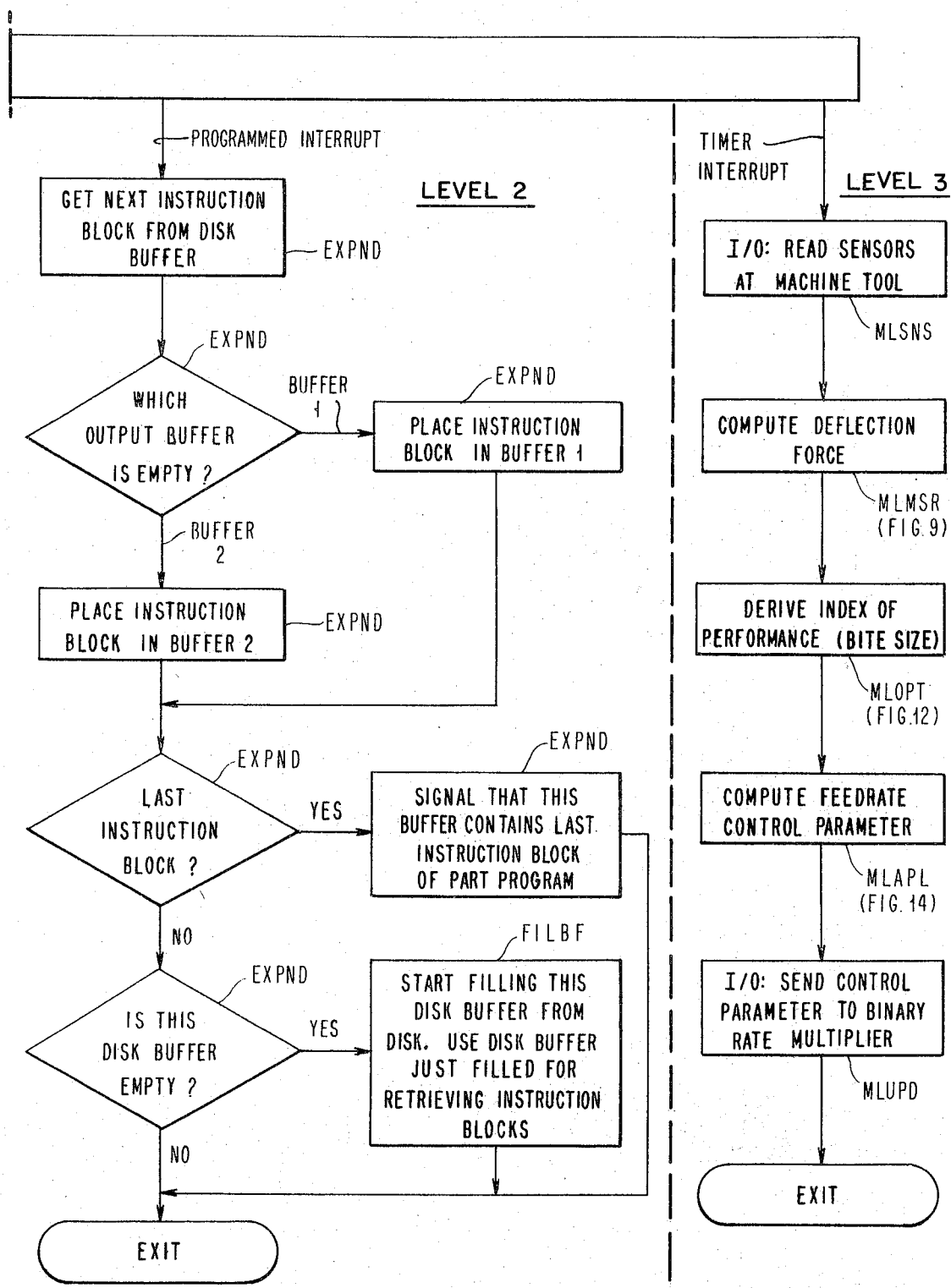
FIG. 6 shows the relationship of FIGS. 6A and 6B which are to be combined in composite form to present a flowchart of the software shown in FIGS. 3A, 3B and FIG. 5, in part, with greatest emphasis upon the functions shown in FIG. 3B.

Another function provided by ACSCN is to set adaptive control 19 into execution upon detection of the first instruction block of the part program. It sets into operation a timer which causes interrupts as shown in FIG. 6 at fixed intervals for the duration of the part program. It also controls stopping of the timer when the cutting of the part is completed. Finally, it causes execution of the computations shown in the FIG. 9 flowchart at the beginning of each cut.

It is interrupts from this timer which drive the adaptive control component which consists of the modules shown in FIG. 3B. MLCTL controls the sequence of execution of the other modules shown in clockwise order of execution. ACSCN is the one adaptive control module not driven by the timer. These interrupts occur at a fixed interval required by the particular system, e.g., 20–40 milliseconds.

MLSNS reads sensor data and places it in the software registers 24. This includes the spindle speed and component forces at the cutting tool. MLMSR computes the force of deflection, $F_D$, as shown in the flowchart of FIG. 10. If the cut is circular, the parameters C1, C2, and C3 are recomputed at fixed angular intervals by this module. MLOPT determines the bite size required as shown in the flowchart of FIG. 12. This is the index of performance used to control the feedrate of the tool. MLOPT uses the $F_D$ computed by MLMSR. In MLAPL the bite size is multiplied by the spindle speed and a constant to obtain a control parameter to be sent to the binary rate multiplier (BRM) 29. Spindle speed is used as a multiplier to stabilize the system. The MLUPD module then sends via digital output the control parameter to the BRM 29. This parameter is a fraction between zero and one representing how much the feedrate is to be reduced from the very high value set by a PCUBE program (described below) in computer 9, FIG. 5. MLMON (not shown) writes to tape the current values of selected AMC parameters as they reside in the software reigsters. Not being part of the adaptive control component, execution of this module can be inhibited from execution if desired.

The flowchart of FIG. 10 shows computations made before execution of a part program. These values computed are used to compute the deflection force equation parameters before each new cut is initiated.

Note, then, that at each timer interrupt interval these adaptive control component modules are executed in the sequence shown and continue to be executed for the duration of the part program execution. Communication between the motion control and adaptive control components is achieved by means of software registers and the ACSCN module.

Path sensitive constant force machining is part of a complete advanced motion control (AMC) system shown in FIG. 5. This system involves both a process control computer 50 for controlling the machine tool 18 and a data processing computer 9 for preparing part programs to be used by the machine tool controller 14 in producing parts. A description of the software components of this system follows showing how the particular components for path sensitive constant force machining relate to the total system.

The purpose of the data processing computer 9 is to prepare the AMC part programs which include adaptive control data, for execution by the process control computer 50. The conventional NC processor accepts as input source language part programs, translating them into machine language (object) part programs with the aid of the necessary post-processors. These are in turn processed by a special program, called PCUBE (for post-post-processor), which formats the part program on magnetic tape for entry into the process control computer 50. Also, PCUBE adjusts feedrates specified in a part program to high values so that they can be modified dynamically down to the desired values, when cutting a part. It also includes user-specified maximum force values for cuts. These maximum force values are used by the process control computer 50 to control the tolerances within which the part is cut. PCUBE is written in PL/I and can operate under control of IBM 360/OS.

This AMC software is written primarily in FORTRAN, with some program modules coded in assembler language. It is executed under control of the IBM 1800 multiprogramming executive (MPX) operating system. The software is a collection of program modules that are combined and built into executeable coreloads by the MPX. These coreloads are then loaded and executed by the MPX according to the various real-time conditions that occur. The system is so designed that various adaptive control algorithms can be built into such coreloads and then loaded under operator control. These coreloads remain core resident during the cutting of a part and are termed the MC & AC coreloads, since that coreload area contains the essential modules for performing both motion control and adaptive control. In this manner various adaptive control algorithms can be tested.

The total core used is 40K, with the following partitions assigned:

1. Executive MPX area 24K
2. MC & AC coreload area 6K
3. Spare partition 2K
4. Variable core 8K Part programs prepared as described are written onto magnetic tape 80 to be used as input to the process control computer 50. The tape 80 is employed as a common storage medium between the two computers 9 and 50, though other media are possible depending on the computers used.

The primary purposes of the advanced motion control software in the process control computer 50 are 1. Direct numerical control (motion control) of the machine tool 18.
2. Adaptive control of the cutting process, and
3. Data analysis of the system. Direct numerical control involves transmitting to the machine tool, under computer control, the commands necessary to make a part. Adaptive control involves modifying the cutting process in real time in order to satisfy some index of performance. Data analysis aids the engineer in evaluating the system and refining the adaptive control techniques.

Secondary purposes of the system are

1. Operator control and
2. Part program maintenance The executive comprises 20,250 words and includes user routines. The executive remains core resident once it has been loaded by the cold-start procedure. The MC & AC coreload used is 3460 words in size, and, as mentioned before, remains core resident for the duration of one part program's execution. Variable core (VCORE) is an area where various coreloads can be rolled in and out as needed on a shared basis. For example, when the display terminal 81 requests attention, the coreload currently resident in VCORE is saved on disk, and the terminal 81 attention routine is loaded from disk. When the attention routine is complete the original coreload is loaded again into core, and its execution continues.

A FORTRAN COMMON area called INSKEL COMMON, is located in the executive. This area is accessible to all programs. It contains all the adaptive control parameters. In this manner data can be communicated among the various program modules being executed in a multiprogramming environment. At cold-start time initial values are read from an adaptive control parameter file and loaded into this area. Certain of these values can be changed by adaptive control parameter cards in any part program.

The functional components of the computer 50 AMC software are shown in FIG. 5. They are part program maintenance, executive and cold start, motion control, adaptive control, operator control, and monitor and data analysis.

PART PROGRAM MAINTENANCE

The part program maintenance component of the AMC software reads the part programs from tape, creates a part program file and an index, and loads them onto disk 10. Entries are added to or deleted from the file and index as part programs are added to or deleted from the system. Then, when a part program is requested by the operator for execution, a search of the index is made for that part program, which is designated by an 8-character identification. If found, the location is identified to the motion control component, and sectors of the file containing the part program are loaded by motion control into core as the part program is being executed. Another function of the part program maintenance component is to list part programs on the printer upon request. A control card containing the tool feedrate number is placed (optionally) in front of the card deck. This ratio specifies by what amount PCUBE is to multiply the programmed feedrate. Multiplication is necessary because the programmed feedrate selected by the part programmer will have been chosen for use with traditional numerical control techniques (i.e., without adaptive control). The BRM 29 on the other hand, can only reduce, in varying degrees, this basic programmed feedrate. To allow the BRM 29 a range that not only includes but exceeds the programmer's estimate of feedrate, that feedrate is multiplied in the PCUBE phase of processing. For example, if the part programmer initially programmed a cut at 10 ipm, one would reasonably expect that in some regions (perhaps air gaps in the cut) the adaptive control system would find it worhthwhile to cut at a feedrate above 10 ipm. If the programmed feedrate sent to the controller is 10 ipm, the BRM 29 can only reduce the feedrate, in varying degrees, below 10 ipm. To allow the BRM to control feedrate above that originally programmed, a higher feedrate (perhaps 20 or 30 ipm) must be sent to the controller 14. In this case, the 10-ipm feedrate would be multiplied in PCUBE by a feedrate ratio number.

The remaining cards in the card deck consist of a header card (which follows the control card), leader cards, adaptive control parameter cards, and instruction-block cards. The header card assigns a part number to the part program. Leader cards are included to produce paper-tape leader in conventional systems. They are ignored by PCUBE. Adaptive control parameter cards contain data necessary to modify the control algorithm for the particular part. The instruction-block cards contain the commands that operate the machine tool. There is one block of commands per card. Software for the process control computer 50 consists of the following six components using 40K as shown in FIG. 5;

1. Executive and cold start
2. Part program maintenance
3. Operator control
4. Motion control
5. Adaptive control
6. Monitor and data analysis The executive is carried out by the MPX program and is a main-storage-resident component that provides the services of interrupt processing, program queuing and loading, system error checking, system reload and restart, and multiprogramming. The cold-start function initially sets up the system and loads AMC parameters from disk 10 into main storage.

The part program maintenance component reads the part programs from tape and creates a part program file on disk 10, and adds or deletes programs from the file. Operator control provides an interface between the system and the operator. Using a display terminal 81 he can inquire about the status of the system and modify the AMC parameters. He can control the execution of part programs also. The monitor and data analysis program samples data during the cutting of a part and writes that data onto tape 82. This data can then be plotted or further processed using data reduction techniques.

The two program components directly concerned with real time control of the cutting process are the motion control and adaptive control programs. The purpose of the motion control program is to direct the machine tool along the conventional part program. The purposes of the adaptive control component program are to:

1. Continually sense the cutting process
2. Derive a control variable(s) based on some index of performance, and
3. Modify the cutting process by using the derived control variables.

As shown in FIG. 5 motion control, on demand, sends instruction blocks to the controller 14 via the AMC interface 48. While this process is going on adaptive control is also executing via the multiprogramming capability provided by the executive. At regular intervals controlled by a hardware timer it is sensing the process at the cutting tool and modifying the feedrate using the binary rate multiplier BRM 29 in the AMC interface 48.

FIG. 6 shows in more detail the adaptive and motion control components. The chart divides the program logic into three logic sections designated level1, level 2, and level 3. The three logic sections are multiprogrammed with one another with the level number indicating the priority as to CPU access each section has. Level 1 has highest priority, level 2 next highest, and level 3 lowest. Level 1 services requests from the controller for instruction blocks via controller interrupts. These requests must be honored first in order to keep the machine tool running. At level 2 the logic controls the filling of the output buffers and disk buffers. This logic is driven by programmed interrupts initiated from the level 1 logic when an output buffer is to be filled. There are two types of buffers employed: output buffer and disk buffer both being main storage resident. An output buffer 13 contains a single instruction block to be sent to the controller 14. There are two such buffers 13. While one is being used to transmit an instruction block to the controller 14, the other is being filled by the logic at level 2. The instruction blocks are retrieved from disk buffers 12 of which there are also two. While one buffer is being used to retrieve instruction blocks to be sent to the controller 14, the other is being filled from disk 10 with the next disk block of instruction blocks for the part program. A disk block contains several instruction blocks and a collection of these comprise the part program as stored on disk 10.

The level three logic is driven by timer interrupts started when the first instruction block of a part program is sent to the controller 14. These interrupts repeat at a fixed interval for the duration of the part program. This logic derives a control parameter used to modify the feedrate of the machine tool 18 and comprises the adaptive control portion of the system while the first two levels of logic comprise the motion control component.

At level 1 when a controller interrupt from line 65 is received requesting the next instruction block of the part program, before the block is sent, ACSCN causes adaptive control data to be carried along with the block and to be passed to adaptive control via a main storage area accessable to both components. Included are the $\Delta x$ and $\Delta y$ components of the tool path and the maximum force required to perform the cut within the desired tolerance. In addition, switches are set signaling adaptive control that a new cut is beginning and causing new constants to be computed for the cut using the algorithm of FIG. 11. The level 1 logic also starts adaptive control upon detection of the first instruction block of the part program being sent and stops it after the last is sent. It initiates the filling of an output buffer 13 by causing a programmed interrupt (handled by the executive) which starts the logic at level 2. It also performs the initialization computations shown in the FIG. 11 flowchart.

The level 2 logic is concerned with making sure that the next instruction block is always ready on demand for the controller 14. It also signals the level one logic when the last instruction block on the part program has been detected.

The timer interrupts driving the level three logic occur at a fixed interval chosen by the operator, usually 20-40 milliseconds. After the interrupt occurs the first function performed is to read the sensors (via analog input) at the machine tool. The values obtained include the spindle speed on line 17 and Fx, Fy component forces on lines 77 and 78 at the tool 18. Next and using the measured component forces, the deflection force, $F_D$, is computed as shown in the FIG. 9 MLMSR flowchart. If the cut is circular, the parameters C1, C2, and C3 are recomputed at this point at fixed angular intervals.

The index of performance (in this case bite size) is next determined as shown in the FIG. 12 MLOPT flowchart. This determination uses the value of $F_D$ previously computed and maximum and minimum allowable forces for the cut passed by the level one logic. This bite size B is then transformed in the FIG. 14 flowchart MLAPL into a control parameter by multiplying it by the normalized spindle speed S/So and a constant. This is the parameter then sent to the binary rate multiplier BRM 29 in the next step. Using normalized spindle speed as a multiplier has the effect of stabilizing the system. The control parameter is written using digital output. It is interpreted as a fraction between zero and one representing by how much the feedrate is to be reduced from the very high value set by the PCUBE program. (FIG. 5).

An initialization function not shown in FIG. 6 is performed before the part program is executed. It computes the offset parameters shown in the flowchart of FIG. 10 and loads both the output and disk buffers 12 and 13.

Referring again to FIG. 9 the deflection force $F_D$ is calculated as shown on the MLMSR chart. Under control of a hardware timer this routine is executed every 20–40 ms, computing the deflection force, $F_D$. This force is then applied to the MLOPT FIG. 12 adaptive control algorithm that caused $F_D$ to be kept within desired limits. The algorithm is applied periodically, the period usually being the same as the period of calculation of $F_D$ (20–40 ms). $F_x$ and $F_y$, which are the sensor readings for the $x-$ and $y-$ axis components of force, are periodically read by the sensing routine (this routine is part of total closed-loop computer-controlled machining system). $C_1$, $C_2$, and $C_3$ are previously computed before the cut is started (see FIG. 11 ACSCN flowchart for "performing initialization for deflection force computation").

Referring to FIG. 10, the offset values for force readings are determined, where $$\bar{M} = \frac{Mx}{My}$$

This routine is executed before the machine tool is started and while the tool is stationary. It computes the $x-$ and $y-$ axis force offset values, $M_x$ and $M_y$, by taking a running average over twenty sensor readings.

These values are then saved for computation of the deflection force equation parameters before each new cut is initiated. $F_x$ and $F_y$ are the sensor readings for the $x-$ and $y-$axis components of rorce and are measured by a dynamometer.

Referring to the ACSCN flowchart of FIG. 11, initialization for deflection force computation of $C_1$, $C_2$, and $C_3$ is computed.

This routine is executed before each cut is initiated by the computer 50. It computes the deflection force equation parameters used in calculating the deflection force. $\Delta x$ and $\Delta y$ are components of the tool path. $q_x$ and $q_y$ are components of the unit vector perpendicular to the tool path. $N_x$ and $N_y$ are components of a calibration matrix used to convert sense readings of the force components into pounts of force units. $C_1$, $C_2$, and $C_3$ are the deflection force equation parameters.

$\Delta x$ and $\Delta y$ are passed along with the part program and are unique to each cut. $N_x$ and $N_y$ are determined by a calibration run and are good for the running of many part programs. $M_x$ and $M_y$ are the offset values obtained before the machine tool is started (see FIG. 10 flowchart which "computes offset values for force readings").

Referring to FIG. 12, the maximum bite size is determined as a function of $F_D$, as shown by the flowchart. As explained above, B is used to determine the new feedrate to be applied.

CONSTANT-INCREMENT SEARCH OPTIMIZING ALGORITHM

The constant-increment search optimizing algorithm is shown graphically in FIG. 13 and is flowcharted in FIG. 12. In effect, it increases the bite size when no limits are exceeded and decreases the bite size when any limit is exceeded. The algorithm is designed to have the control variable (bite size) rapidly approach the optimum operating region by defining outer regions, far from FDMAX and BMAX where the size of the increment I is increased by the factor A.

Using cutter deflection force and bite size as constraints, this algorithm allows a system to control the tolerance of cutting to less than 0.001 in.

FIG. 14 shows the MLAPL flowchart for calculation of BRM. The value is achieved by multiplying the bite size B from FIG. 12 MLOPT times the ratio of actual spindle speed S to nominal spindle speed So. Nominal spindle speed is no load spindle speed.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A closed loop tool control system comprising
   a tool having a workpiece supported with respect thereto, said tool extending towards said workpiece,
   a plurality of motors for relatively moving said tool and said workpiece,
   an automatic tool controller connected to said tool and said motors for providing control of the operation thereof,
   a plurality of sensing means for producing signals proportional to the deflection force between said tool and said workpiece having an output,
   program means for supplying program control to said controller and corresponding data to closed loop control means
   closed loop control means for continuously calculating and recalculating changing values of the critical component of said deflection force transverse to the path of motion directed by said data from said program means,
   said closed loop control means having an input connected to an output of said program means, said closed loop control means operating upon said critical component to provide an output control signal varying with said critical component, motor rate means connected to said controller for controlling the rate of operation of said motors in response to control signals, said motor rate means having an input, and means for connecting said output control signal from said closed loop control means to said input of said motor rate means.

2. Apparatus in accordance with claim 1 wherein said control means includes means for calculating the motor rate as a product of normalized tool speed and bite size.

3. Apparatus in accordance with claim 1 wherein said control means operates to adjust bite size to an optimum value, wherein if deviation exceeds a predetermined limit, the applied correction of motor rate is greater than within said limit.

* * * * *